US006112630A

United States Patent [19]

Miura

[11] Patent Number: 6,112,630

[45] Date of Patent: Sep. 5, 2000

[54] CUTTING PLOTTER

[75] Inventor: Etsuji Miura, Irvine, Calif.

[73] Assignee: Graphtec Technology, Inc., Irvine, Calif.

[21] Appl. No.: 09/298,173

[22] Filed: Apr. 23, 1999

[51] Int. Cl.[7] .............................. B26D 5/20; G06F 15/00

[52] U.S. Cl. ............................ 83/76.6; 83/76.8; 83/76.9; 83/939; 83/403.1; 364/470.05; 364/478.01; 364/468.21

[58] Field of Search ............................ 83/938, 939, 937, 83/76.1, 76.6, 76.7, 76.8, 76.9, 13, 56, 941, 649, 949, 403.1, 936; 364/470.01, 470.05, 478.01, 710.13, 468.21

[56] References Cited

U.S. PATENT DOCUMENTS

| | | | |
|---|---|---|---|
| 4,221,145 | 9/1980 | Shimizu et al. | 83/76.7 |
| 4,506,824 | 3/1985 | Bartz | 83/76.8 X |
| 4,512,839 | 4/1985 | Gerber | 83/76.6 X |
| 4,700,598 | 10/1987 | Gerber | 83/937 X |
| 4,737,904 | 4/1988 | Ominato | 83/76.8 X |
| 4,996,651 | 2/1991 | Wells . | |
| 5,188,009 | 2/1993 | Sunobara et al. . | |
| 5,214,590 | 5/1993 | Schnetzer | 83/76.6 X |
| 5,443,194 | 8/1995 | Takahashi . | |

*Primary Examiner*—M. Rachuba
*Assistant Examiner*—Boyer Ashley
*Attorney, Agent, or Firm*—Oliff & Berridge, PLC

[57] ABSTRACT

A cutter plotter for drawing a roll type cutting sheet and cutting it, prevents bad influences accompanied with increasing of drawing resistance when drawing the roll type cutting sheet from a rolled part. If a feeding amount of the cutting sheet by a cutting order to be executed is over an amount already fed at that time, the cutting sheet is further fed in a Y-direction prior to execution of the cutting order for compensating said over amount.

4 Claims, 8 Drawing Sheets

CUTTING PLOTTER

BACKGROUND OF THE INVENTION

1. Field of the Invention

The present invention relates to a cutting plotter for consecutively cutting a cutting sheet in accordance with image data produced by a computer so as to make desired mortised images, and in particular to a cutting plotter using a roll type cutting sheet as a cutting sheet.

2. Description of the Related Art

The representative cutting plotters of this type are disclosed in, for example, U.S. Pat. No. 4,996,651, U.S. Pat. No. 5,188,009 or U.S. Pat. No. 5,443,194. In particular, a device disclosed in U.S. Pat. No. 5,443,194 uses a rolled cutting sheet as a cutting sheet. The cutting plotter of this type is used for making dress fitting patterns or signing labels to be pasted onto show-windows for enhancing advertising effects. Such a cutting plotter successively receives image data to be cut out (borderline data of the image, hereinafter referred to as "cutting data") from a computer such as a CAD device, and obtains desired mortised images by moving a cutting pen in succession following a sequence of cutting data.

In a device using a rectangular cutting sheet as disclosed in U.S. Pat. No. 4,996,651, mortised images are limited to sizes smaller than the size of the instant cutting sheet. However, in the case of using the roll type cutting sheet as in the device of U.S. Pat. No. 5,443,194, the continuous cutting sheet can be drawn out in succession by feeding the cutting sheet in a y direction. Such a mortised image of considerably large size in the y direction can be also produced.

The image lengthy in the feeding direction of the rolled cutting sheet, i.e., in the y direction is cut out by the cutting pen while the rolled cutting sheet is fed in the y direction. However, the cutting may confront an abrupt increase in feeding resistance of the cutting sheet during cutting. This is caused by existences of a firmly rolled part and an already fed part drawn from the firmly rolled part in the cutting sheet on use in the device of this type. This is because cutting of a portion exceeding the already fed amount requires superfluous force for loosening the rolling of the rolled part although the cutting is normally carried out for the already drawn cutting sheet.

When such a case occurs, a new cutting is made different from the cutting action up to that time and the cutting part is disordered (sharpness at a cut end is soft), or a cutting line traces a different locus from the desired line, so that cut qualities are very deteriorated and the cutting speed is remarkably delayed.

SUMMARY OF THE INVENTION

The present invention has been made to solve the above problems with the conventional device, and therefore an object of the present invention is to provide a cutting plotter using a roll type cutting sheet which prevents cut qualities from deterioration and obtains satisfactory mortised images at high speed.

To achieve the above object, according to the present invention, there is provided a cutting plotter using a roll type cutting sheet, comprising: means for controlling an already fed amount of the cutting sheet now drawn (out of the rolled part); means for calculating, with respect to each of a series of cutting data to be executed, a maximum arrival position in the y direction, i.e., a maximum feeding amount in the y direction of each of the cutting data; means for judging, before cutting each of the cutting data, whether or not it is possible to execute cutting by the current cutting data within the already fed and now drawn amount of the cutting sheet, and means for compensating feeding of the cutting sheet by a predetermined amount prior to executing cutting of the cutting data if a judgement made by said judging means judges is impossible.

With the above structure, even if the cutting is made in the cutting data lengthy in the y direction, since the cutting sheet never lies under a rolled condition, the feeding resistance of the cutting sheet is not increased during cutting by the cutting data, whereby the cut quality can be kept satisfactory.

Further, if the cutting sheet is fed by a necessary amount in advance before execution of the cutting, the cutting action may be performed at high speed.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments with reference to the accompanying drawings.

Figure 1:
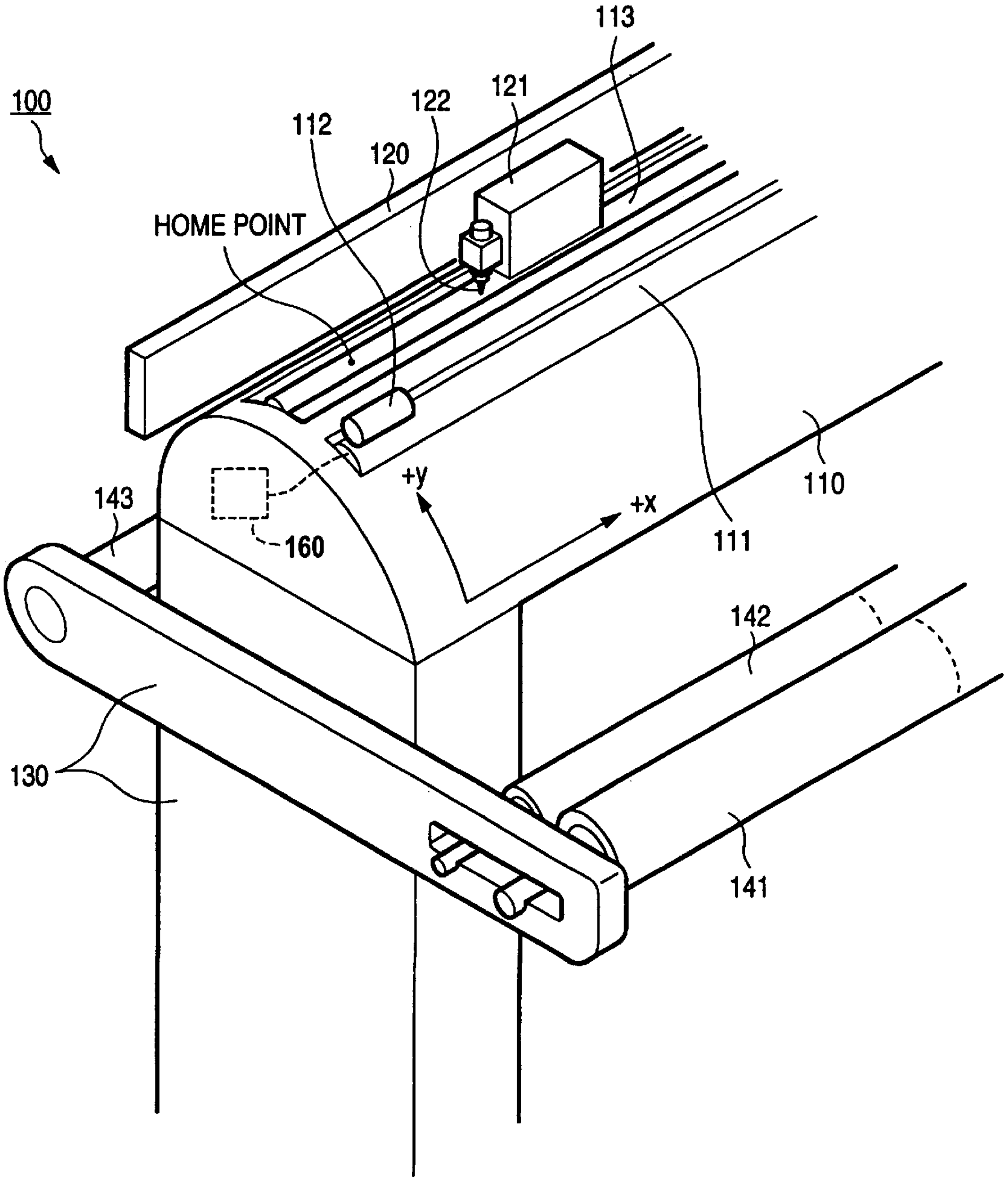
FIG. 1 is an explanatory diagram showing a structure of an element part of a cutting plotter to which the present invention is applied.
Figure 4:
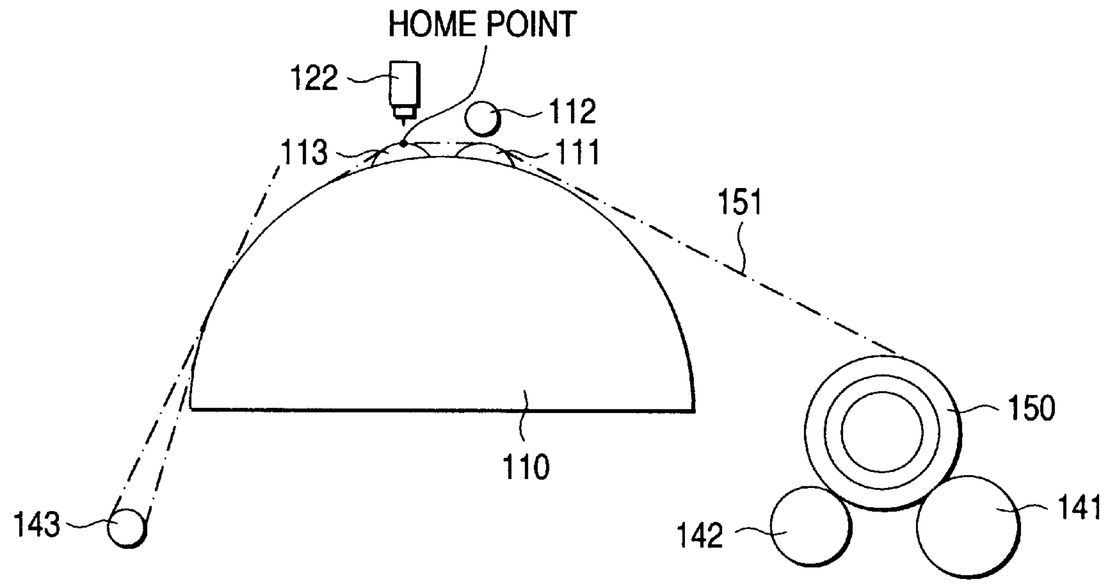
FIG. 4 is a diagram showing a state where the cutting sheet is set on the cutting plotter.

Referring to FIG. 1, a housing 130 is furnished with a platen 110, a first support roller 141, a second support roller 142 and a setting bar 143 in predetermined place. The first and second support rollers 141 and 142 may rotate respectively, and, for example, as shown in FIG. 4, a rolled part 150 of the roll type cutting sheet gets on those first and second support rollers 141 and 142.

On the top portion of a platen 110, a drive roller 111 and a cutting mat 113 are disposed in parallel over the full width X-direction of the platen 110. The drive roller 111 is rotated at a predetermined speed by a Y-directing motor 160 and is engageably furnished with pinch rollers 112 at both ends, and those members 111, 112 and 113 serves as means for feeding the cutting sheet.

On the cutting mat 113, a cutter block 121 as cutting means is mounted movably in an X-direction along an X-rail 120, and is connected to an X-directing motor (not shown), and further this cutting block 121 is provided with a cutter pen 122 vertically movable by an actuator (not shown).

Thus, while the cutting sheet is fed in the Y-direction in response to a series of cutting orders, the cutter block 121 is shifted back and forth along the X-direction under a state where the cutter pen 122 is brought down, so desired figures may be obtained by means of the cutting plotter 100.

Figure 2:
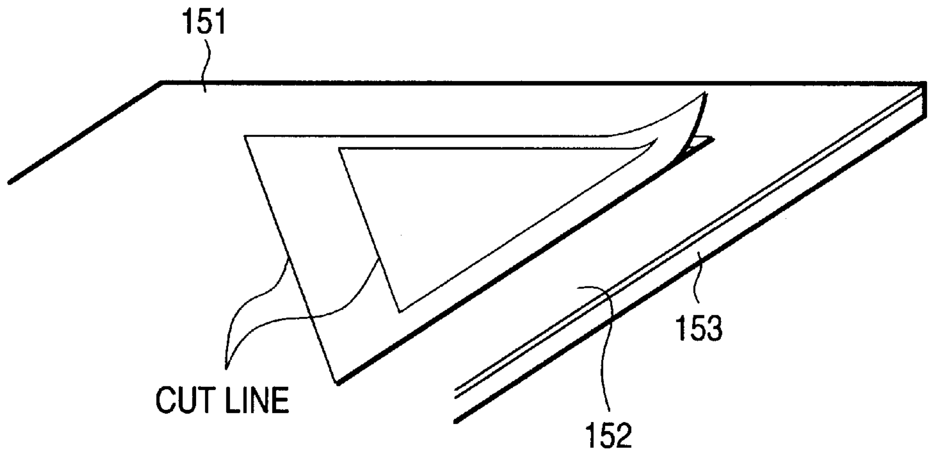
FIG. 2 is a view showing one example of a cutting sheet available in the present invention.

FIG. 2 shows one example of the cutting sheet 151 to be suitably applied to the cutting plotter 100. The cutting sheet 151 is of a structure in which a cutting film 152 is pasted to a base film 153 with an adhesive, and may be delaminated along lines cut by the cutter pen 122.

First Embodiment

Now, a cutting plotter according to a first embodiment of the present invention will be described.

Figure 3:
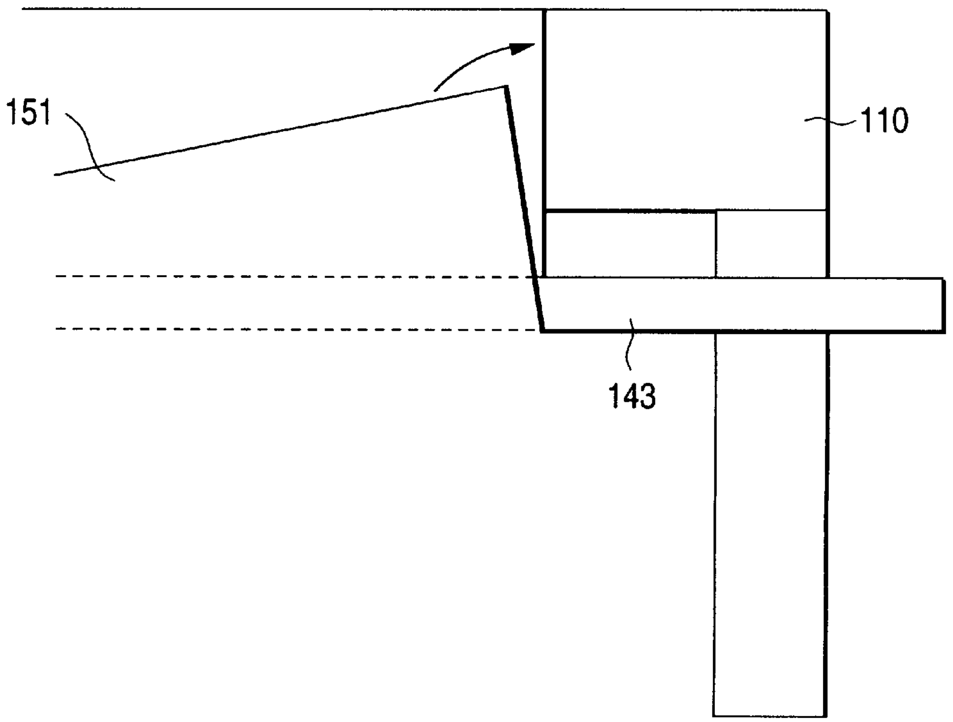
FIG. 3 is an explanatory diagram for explaining alignment of the cutting sheet when the cutting sheet is set.
Figure 5:
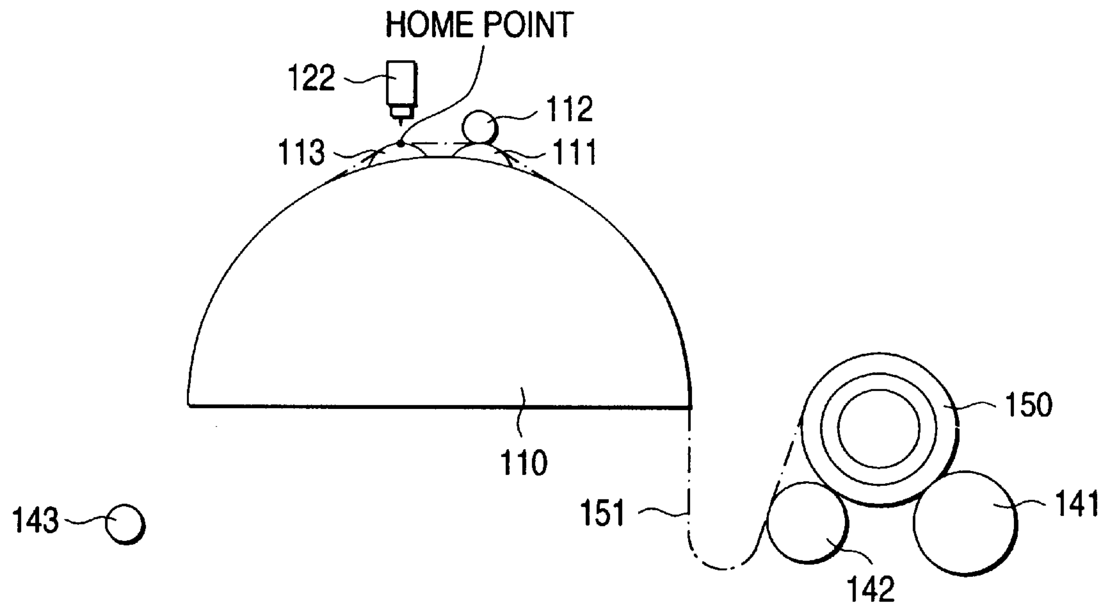
FIG. 5 is a diagram showing a state where the cutting sheet is positioned at an initial position after being set on the cutting plotter.
Figure 9:
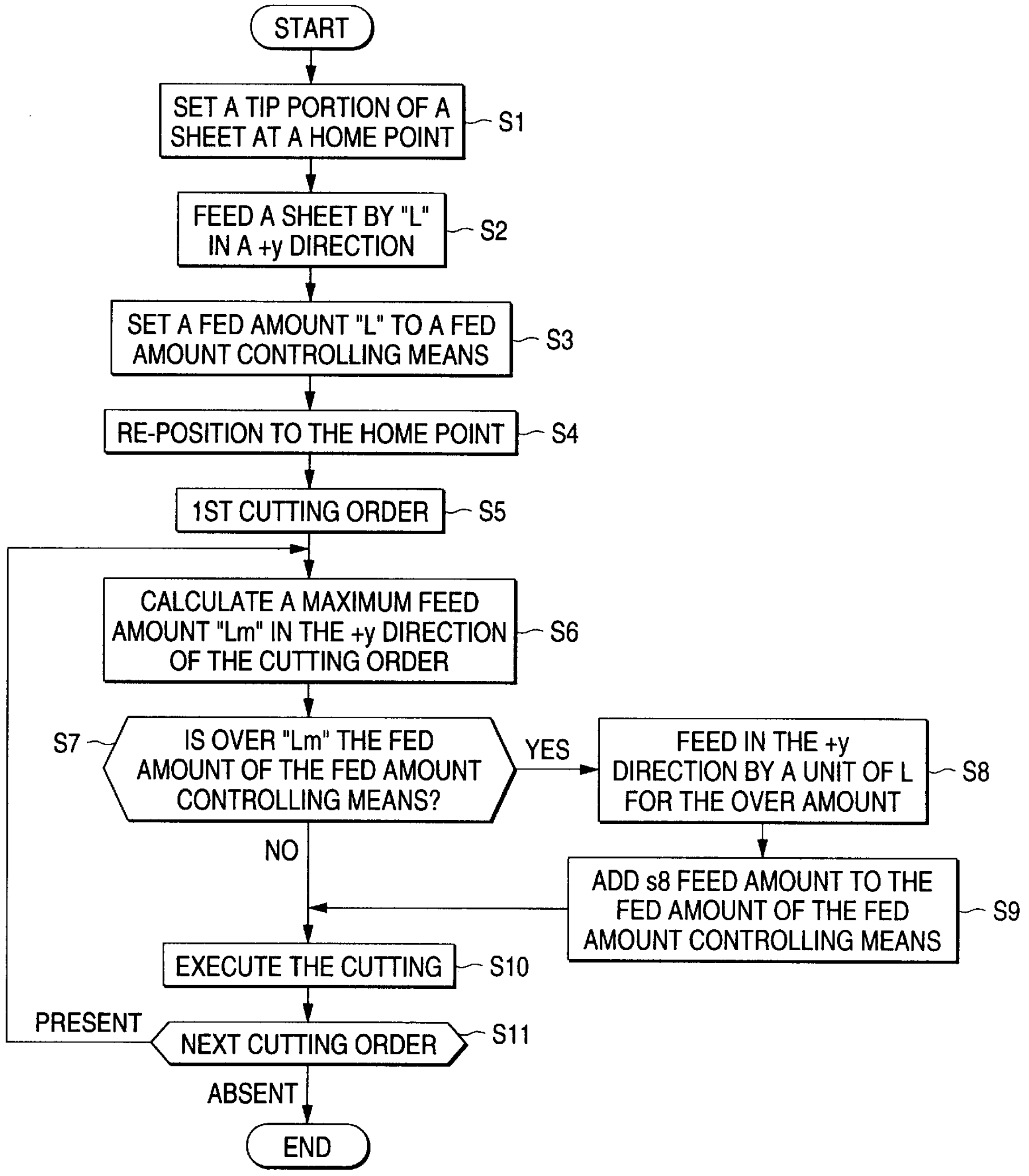
FIG. 9 is a flowchart showing an action of a first embodiment of the present invention.

Referring to FIG. 9, an end portion of the cutting sheet 151 is first set at a home point of the cutting plotter at step S1. This action is shown in FIGS. 3 to 5. FIG. 4 shows a state in which an operator draws the cutting sheet 151 from the rolled part 150 of the roll type cutting sheet mounted on the first and second support rollers 141 and 142, and sets it onto the cutting plotter. The cutting sheet 151 is drawn until it goes over the drive roller 111, the cutting mat 113 and the setting bar 143. The drawn sheet 151 is turned back around the setting bar 143, and as seen in FIG. 3, the turned back cutting sheet 151 is aligned at an end thereof with the cutting sheet 151 still resting on the platen 110. At completion of this alignment, the pinch roller 112 shown in FIG. 4 is brought down to support the cutting sheet 151. Until this operation is the operator's role. Subsequently, as shown in FIG. 5, the Y-directing motor 160 is reversely driven to feed the cutting sheet in a reverse direction so as to position the end point of the cutting sheet 151 at the home point. In this connection, the home point is meant by a reference point for performing the cutting action.

Figure 6:
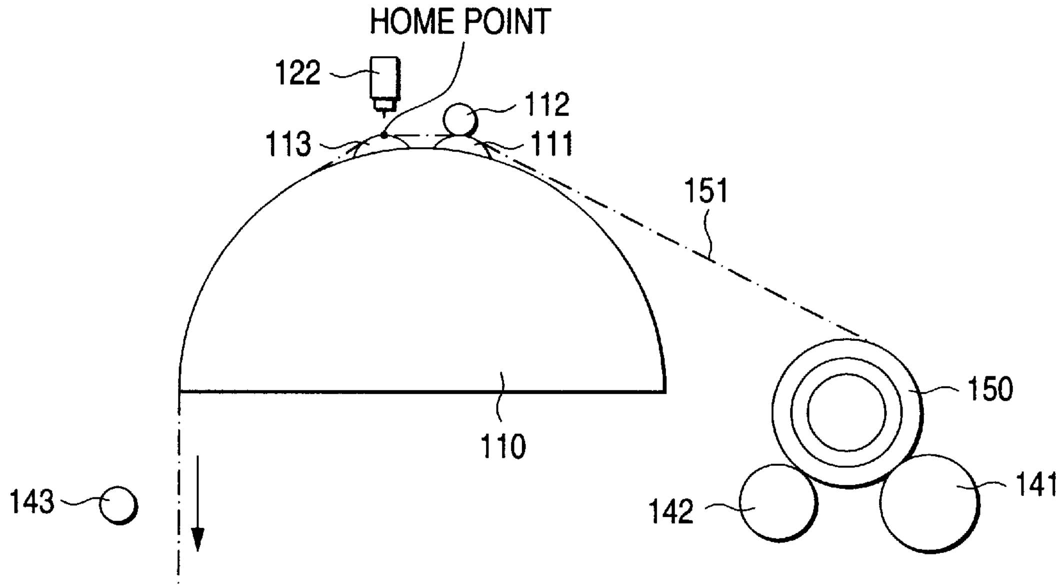
FIG. 6 is a diagram showing a state where the cutting sheet is fed by a predetermined amount in advance prior to cutting.
Figure 7:
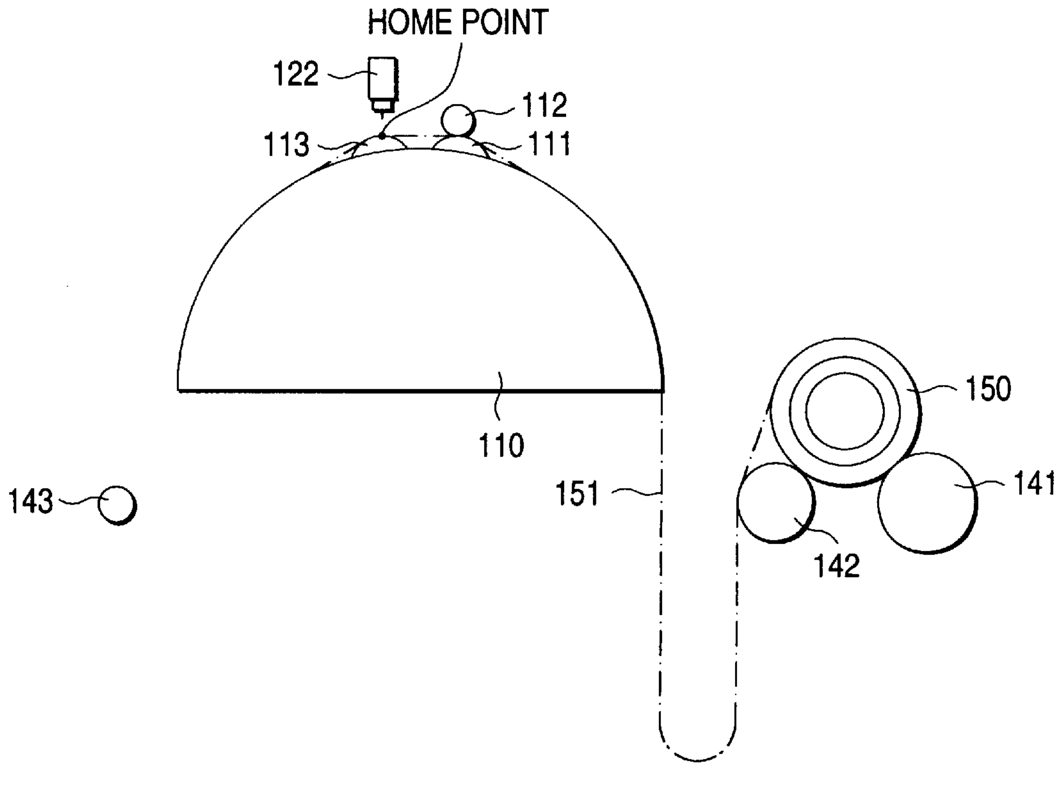
FIG. 7 is a diagram showing a state of the cutting sheet immediately before starting the cutting.

As seen in steps S2 to S4 of FIG. 9, the cutting sheet 151 is fed by a predetermined length L. This action is shown in FIGS. 6 and 7. The drive roller 111 is rotated in the +Y-direction in such a manner that the length of the cutting sheet 151 to be drawn from the roll type cutting sheet 150 becomes L. The drawing length of the cutting sheet 151 at this time is available by controlling a rotation amount of the Y-directing motor 160. Then the fed amount L of the cutting sheet 151 is stored by the cutting plotter 100 in a memory provided in means for controlling the fed amount. The state shown in FIG. 7 is that the cutting sheet 151 is reversely fed to re-position it to the home point (step S4 of FIG. 9). With the above operation, a preparation for the cutting action is accomplished.

At step S5 of FIG. 9, a first cutting order is inputted to the cutting plotter 100, and at step S6, calculation is made for a maximum amount Lm in the Y-direction of this cutting order. Then, Lm is subsequently compared with the fed amount L stored in the means for controlling the fed amount at step S7. If Lm is not more than L (since a feeding amount by this cutting order is within the drawn and already fed amount L), cutting is executed as it is at step S10. If Lm exceeds L (since, if the cutting is executed as it is, the roll type cutting sheet must be drawn from the rolled part 150 on the way so that the feeding resistance is abruptly increased), a compensation feed action is executed (step S8 in FIG. 9) for feeding the cutting sheet 151 on a unit of L in regard to an excessive amount of Lm. At step S9, a further feed amount in this compensation feed action is added to the already fed amount made by the fed amount controlling means. Then, cutting is executed according to the cutting order at step S10.

At step S11 of FIG. 9, it is judged whether a next cutting order is issued or not, and if it is issued, processing goes to step S6 where the maximum feed amount in the +Y direction of a next cutting order is calculated, and the above mentioned actions are executed in succession. If a next cutting order is not issued at step S11, the cutting action is finished.

Figure 8:
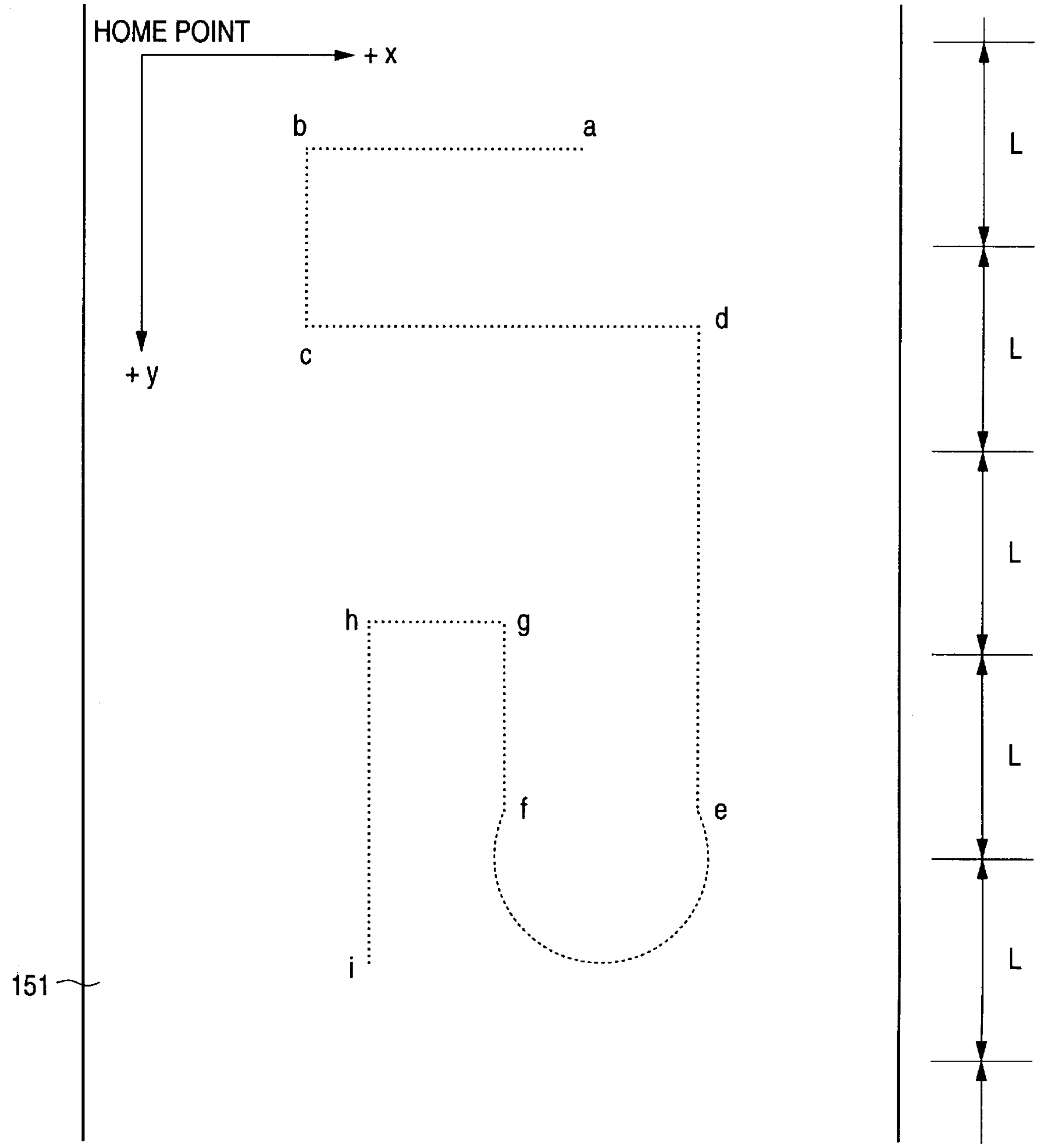
FIG. 8 is an explanatory diagram for explaining cutting actions with respect to a series of the cutting data.

FIG. 8 exemplifies the above mentioned cutting actions. In this example, "a-b cutting order", "b-c cutting order", "c-d cutting order", "d-e cutting order", "e-f cutting order", "f-g cutting order", "g-h cutting order" and "h-i cutting order" are inputted in succession to the cutting plotter 100 and then executed there. Since the first "a-b cutting order" is an order by which cutting is made in parallel with the X-direction, cutting can be executed without further feeding the cutting sheet 151 in the Y-direction. Although the succeeding "b-c cutting order" is an order by which cutting is made in parallel with the Y-direction, since the feed amount between b-c exceeds the fed amount "L" stored in the fed amount controlling means, the cutting sheet is fed for compensation by L before cutting is carried out. Since the "c-d cutting order" does not exceed the fed amount 2*L at this point, it is executed as it is. The "d-e cutting order" has a final arrival position e, and exceeds the fed amount 2*L by $L+\Delta L(\Delta L<L)$. Therefore, to compensate the excessive amount prior to executing the "d-e cutting order", the cutting sheet 151 is further fed by 2*L. As a result, the fed amount of the cutting sheet 151 is 4*L at this point, and the "d-e cutting order" is then executed. Although the succeeding "e-f cutting order" also exceeds the fed amount 4*L, since the excessive amount of this case is less than L, it is sufficient to further feed the cutting sheet 151 by L. Since each of "f-g cutting order", "g-h cutting order" and "h-i cutting order" does not exceed the fed amount 5*L, each is executed as it is.

Second Embodiment

Figure 10:
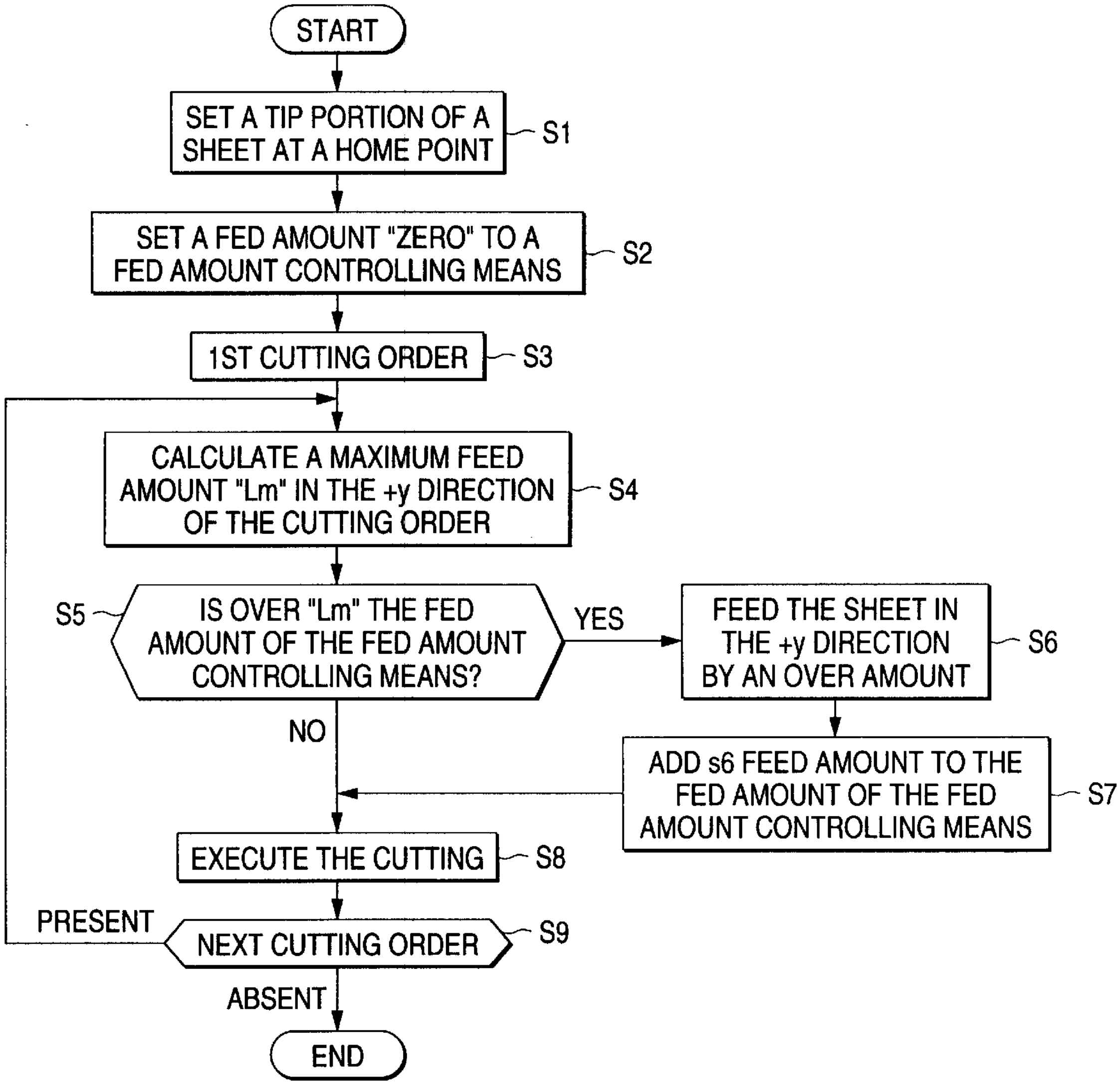
FIG. 10 is a flowchart showing an action of a second embodiment of the present invention.

FIG. 10 is a flowchart showing the operation of a second embodiment. The second embodiment is different from the first embodiment in the following regards.

a) In the first embodiment, the cutting sheet 151 is fed by the predetermined amount L prior to executing the first cutting order, whereas in the second embodiment, an already fed amount is determined to be zero (0) at a time of a first cutting order, and when the first cutting order is executed, the cutting sheet 151 is previously fed by an amount to feed by the first cutting order.

b) In the first embodiment, if the cutting order over the fed amount comes during executing the series of cutting orders, the cutting sheet 151 is fed by L as a unit, whereas in the second embodiment, the cutting sheet 151 is fed by the excessive amount with respect to the cutting order over the fed amount.

Figure 11:
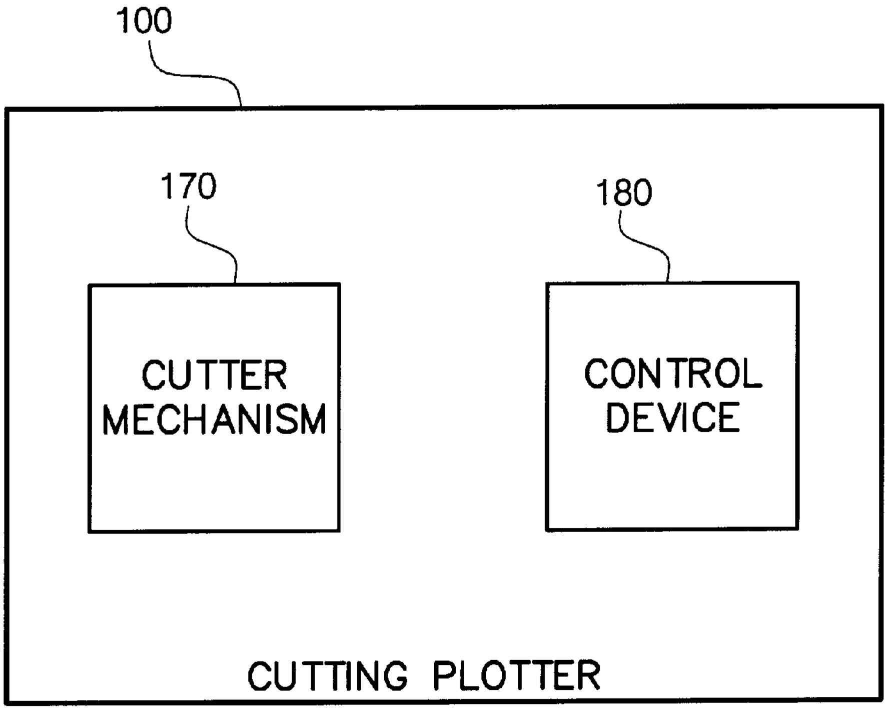
FIG. 11 is a block diagram illustrating the cutting plotter according to the invention.

As show in FIG. 11, the means for calculating a maximum feed amount of the cutting sheet of the cutting order, the fed amount controlling means, the memory, the means for comparing the maximum feed amount with the fed amount, and the compensation feeding means may be included in a separate control device 180, such as computer or a CAD device from which the cutting mechanism 170 receives image data to be cut out or incorporated directly into the cutting plotter 100.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cutting plotter using a roll type cutting sheet, comprising:

feed means for drawing the roll type cutting sheet in a Y-direction while shifting the drawn cutting sheet back and forth along the Y-direction in response to a cutting order;

cutting means for cutting the cutting sheet in a desired shape while shifting the drawn cutting sheet back and forth along a Y-direction;

feed amount calculating means for calculating a maximum feed amount of the cutting sheet in the Y-direction of the cutting order to be executed;

fed amount controlling means for storing as a fed amount a feeding of the cutting sheet in the Y-direction of the cutting sheet at a time of executing said cutting order;

comparing means for comparing the maximum feed amount calculated by said feed amount calculating means with the fed amount stored by said fed amount controlling means; and compensation feeding means for, if the maximum feed amount of the cutting order is over the fed amount, further feeding the cutting sheet in the Y-direction by at least the excessive amount prior to execution of the cutting order.

2. The device as set forth in claim 1, wherein said feed means comprises a drive roller connected to a Y-directing motor and a pinch roller.

3. The device as set forth in claim 1, wherein said cutting means comprises a cutter pen having a cutting blade for cutting the cutting sheet.

4. The device as set forth in claim 1, wherein said compensation feeding means feeds the cutting sheet on predetermined feeding amount unit.

* * * * *